United States Patent [19]
Sato et al.

[11] Patent Number: 5,228,021
[45] Date of Patent: Jul. 13, 1993

[54] MULTIDISK PLAYER INCLUDING A DISPLAY THAT INDICATES TITLES AND KINDS OF DISKS WITHIN THE PLAYER

[75] Inventors: Hitoshi Sato; Akira Hayama; Toshiyuki Kimura; Junichi Nishida; Fumio Endo; Kiyoshi Furukawa; Kenji Kaneko, all of Kawagoe, Japan

[73] Assignee: Pioneer Electronic Corporation, Tokyo, Japan

[21] Appl. No.: 644,980

[22] Filed: Jan. 23, 1991

[30] Foreign Application Priority Data

Apr. 17, 1990 [JP] Japan .................. 2-100623

[51] Int. Cl.⁵ .............................................. G11B 7/00
[52] U.S. Cl. .................................. 369/58; 369/32; 369/111; 369/124
[58] Field of Search .................. 358/342; 369/47–48, 369/54, 58, 32, 44.29, 111, 124; 360/27

[56] References Cited

U.S. PATENT DOCUMENTS

| | | | |
|---|---|---|---|
| 4,791,622 | 12/1988 | Clay et al. | 369/58 X |
| 4,841,506 | 6/1989 | Kiyoura et al. | 369/32 |
| 4,862,439 | 8/1989 | Ando et al. | 369/58 X |
| 4,885,644 | 12/1989 | Ishii et al. | 369/54 X |
| 4,926,404 | 5/1990 | Kimura et al. | 369/32 |
| 5,056,075 | 10/1991 | Maruta et al. | 369/44.29 |
| 5,103,317 | 4/1992 | Nomura | 369/32 X |

FOREIGN PATENT DOCUMENTS

| | | |
|---|---|---|
| 306909 | 3/1989 | European Pat. Off. . |
| 310678 | 4/1989 | European Pat. Off. . |
| 2227354 | 7/1990 | United Kingdom . |

*Primary Examiner*—W. R. Young
*Attorney, Agent, or Firm*—Perman & Green

[57] ABSTRACT

A display apparatus for a multidisk player including a memory for storing data of titles and disk kinds for a plurality of disks, and a controller for reading all the stored data and displaying the title and the disk kind of each disk on a display in accordance with the read data. Accordingly, a user can acknowledge the content of each disk at a glance without actually playing the disks. Furthermore, the user can conveniently distinguish an audio disk from a ROM disk and select a desired one of these disks.

3 Claims, 7 Drawing Sheets

MULTIDISK PLAYER INCLUDING A DISPLAY THAT INDICATES TITLES AND KINDS OF DISKS WITHIN THE PLAYER

BACKGROUND OF THE INVENTION

1. Field of the invention

The present invention relates to a display apparatus for a multidisk player.

2. Description of the Related Art

A multidisk player capable of accommodating a plurality of disks and selectively playing one of the disks is known. The multidisk player is preferably mounted on a vehicle in particular because it is advantageous that a user needs not to exchange the disk every time the play of one disk is ended.

Normally, in playing a desired disk, the user designates a disk number to be defined by a set position of the desired disk, so that the desired disk corresponding to the designated disk number is selected to start playing. Accordingly, the user must know the disk number of the desired disk so as to play the desired disk. However, it is impossible for the user to remember contents of all the disks accommodated in the player in correspondence to the disk numbers of all the disks. Accordingly, the user is obliged to actually play the disks and listen to the tunes recorded on the disks, so as to acknowledge the contents of the disks.

Further, it is also known that such a multidisk player can accommodate not only ordinary audio disks such as CDs (compact disks) but also ROM disks such as CD-ROMs, and selectively play or reproduce one of these disks. The multidisk player of this type is advantageous in saving of a mounting space in a vehicle, and it is commonly used for both the play of the audio disk and the reproduction of the ROM disk. In the ROM disk, driving information such as a map is preliminarily stored, and it is read as desired during driving of the vehicle. However, there is a possibility in such a multidisk player that the user erroneously selects the ROM disk in spite of his desire that the audio disk is to be selected, or in contrast, he erroneously selects the audio disk in spite of his desire that the ROM disk is to be selected.

SUMMARY OF THE INVENTION

It is an object of the present invention to provide a display apparatus for a multidisk player which enables a user to acknowledge a content of each disk without actually playing the disks.

It is another object of the present invention to provide a display apparatus for a multidisk player which enables a user to distinguish an audio disk from a ROM disk and select a desired one of these disks.

According to the present invention, there is provided a display apparatus for a multidisk player capable of accommodating a plurality of disks inclusive of an audio disk and a ROM disk and selectively playing or reproducing one of the disks, the display apparatus comprising storing means for storing data of titles and disk kinds of the plural disks, and control means for reading all of the data stored in the storing means and displaying the title and the disk kind of each disk on a display in accordance with the read data.

BRIEF DESCRIPTION OF THE DRAWINGS

Figure 1:
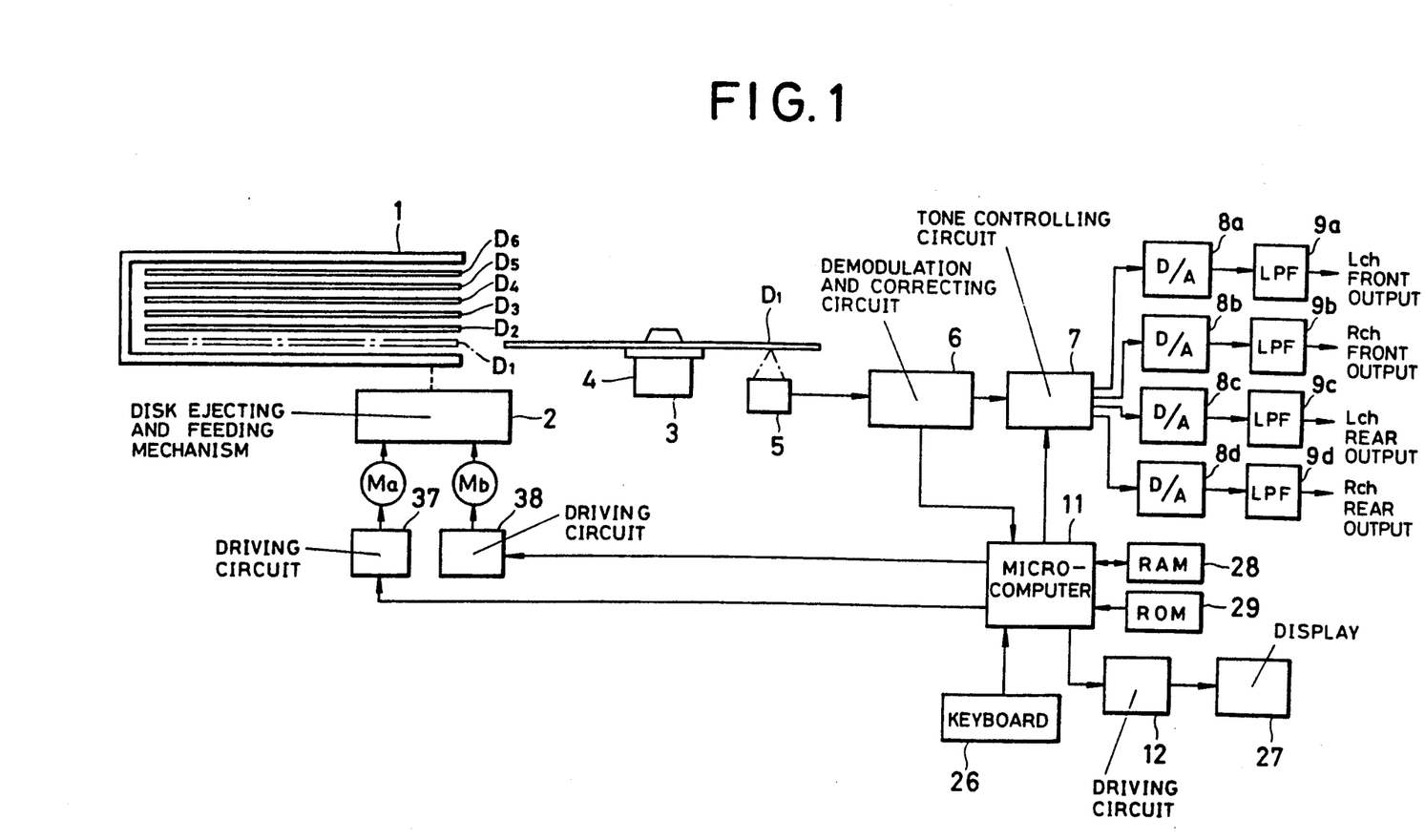
FIG. 1 is a schematic diagrammatic illustration of a multidisk player including the display apparatus according to the present invention.

FIG. 1 shows a schematic construction of a multidisk player according to the present invention. Generally, the multidisk player is provided with a magazine for accommodating a plurality of disks (CD), and is capable of carrying out continuous play for continuously playing all tunes recorded on the plural disks, program play for playing preliminarily selected tunes in a preliminarily designated order, or random play for playing arbitrarily selected tunes according to random numbers or the like. Further, this player is also capable of reproducing information on a disk of CD-ROM, and the magazine can accommodate both the ordinary audio CDs and the CD-ROMs in mixture. In this preferred embodiment, six disks $D_1$ to $D_6$ are accommodated in a magazine 1 and are arranged in different stages at a given pitch. The magazine 1 is provided with six trays (not shown) for carrying the respective disks $D_1$ to $D_6$ in such a manner that the trays can be projected from or retracted into a body of the magazine 1. The magazine 1 is detachably mounted to a predetermined mounting portion of a body of the player. One of the six disks D1 to D6 carried on the respective trays in the magazine 1 is ejected and fed onto a turntable 4 fixed to a rotating shaft of a spindle motor 3, thereafter being clamped, by a disk ejecting and feeding mechanism 2.

The disk ejecting and feeding mechanism 2 includes an ejecting member (not shown) for projecting one of the trays in the magazine 1 and moving the disk on the projected tray onto the turntable 4, a clamping mechanism (not shown) for clamping the disk when the disk is moved onto the turntable 4 by the ejecting member, a moving plate (not shown) for changing a position of the ejecting member relative to the magazine 1 in a direction of arrangement of the accommodated disks, and sensors for sensing a position of the moving plate, operation of the clamping mechanism, etc. In the disk ejecting and feeding mechanism 2, the moving plate is driven by a motor Ma to be controlled through a driving circuit 37 by a microcomputer 11, and the ejecting member is driven by a motor Mb to be controlled through a driving circuit 38 by the microcomputer 11. In operation, the moving plate is moved by the motor Ma to position the ejecting member in opposition to the tray corresponding to a desired disk. Then, the ejecting member is driven by the motor Mb to eject the selected tray, thus selecting the desired disk. The construction of the magazine 1 and the disk ejecting and feeding mechanism 2 is described in more detail in Japanese Patent Laid-open Publication Mo. 62-14369.

Recorded information on the disk rotated by the spindle motor 3 is read by a pickup 5, and a read RF signal is generated from the pickup 5. The read RF signal is demodulated and processed for error correction or the like in a demodulating and correcting circuit 6 to obtain a digital audio signal. The digital audio signal is supplied to a tone controlling circuit 7. The tone controlling circuit 7 comprises a DSP (digital signal processor) and an external RAM connected thereto, for example. A sound field data indicating a sound field pattern of the audio signal is supplied from the microcomputer 11 to the tone controlling circuit 7.

The digital audio signal generated from the tone controlling circuit 7 has an Lch (left channel) front output signal, a Rch (right channel) front output signal, an Lch rear output signal and Rch rear output signal. These output signals are converted into analog audio signals by D/A converters 8a to 8d, and the analog audio signals are output through LPFs (low pass filters) 9a to 9d. Then, the analog audio signals are reproduced through amplifiers (not shown) by Lch front and rear speakers (not shown) and Rch front and rear speakers (not shown). Further, a subcode signal containing TOC (Table Of Contents) information is supplied from the demodulating and correcting circuit 6 to the microcomputer 11. Further, in case of reproducing the CD-ROM, a main code signal is also supplied to the microcomputer 11.

A keyboard 26, RAM 28 and ROM 29 are connected to the microcomputer 11. The keyboard 26 is provided with a plurality of keys (not shown) including a play key for commanding play start, a stop key for commanding play stop, a title input key for commanding title input, disk number (numerals "1" to "6") keys for designating a disk to be played, and alphabet ("A" to "Z") keys for inputting title characters.

Figure 2:
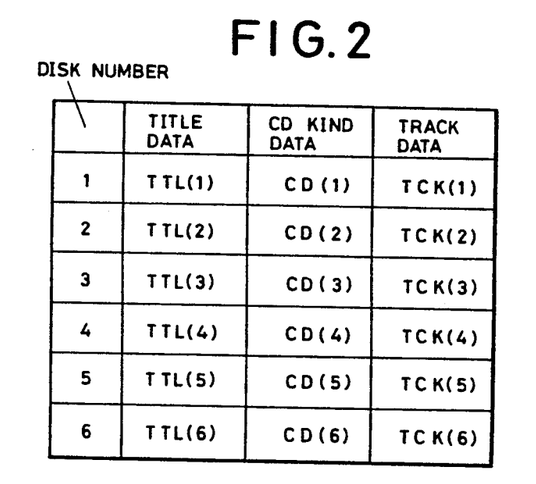
FIG. 2 is an illustration of a display data memory area.

The RAM 28 has a display data memory area as shown in FIG. 2. In the display data memory area are stored title data TTL(m) indicating title characters of each disk corresponding to disk number n (n represents integers of 1 to 6), CD kind data CD(n) indicating whether or not the disk corresponding to the disk number n is CD-ROM, and track data TCK(n) indicating the number of tracks in each disk.

A display 27 is connected through a driving circuit 12 to the microcomputer 11. The display 27 is a dot indication type display such as a liquid crystal display. The driving circuit 12 includes a memory (not shown) having locations corresponding to all dots of the display 27. A display pattern data supplied from the microcomputer 11 is written in the memory of the driving circuit 12 to display a pattern of title characters or the like indicated by the display pattern data on the display 27. Further, a command for designating a display area in the display 27 is also supplied form the micrompmuter 11 to the driving circuit 12. In a basic display pattern indicating a list of all the disks as shown i FIG. 3, the display area is comprised of areas A(1) to A(6) for displaying the titles of the disks $D_1$ to $D_6$, respectively, areas B(1) to B(6) of the disks $D_1$ to $D_6$, respectively, and areas C(1) to C(6) for displaying the number of tracks in the disks $D_1$ to $D_6$, respectively.

There will now be described the display operation to be controlled by the microcomputer 11 in accordance with flowcharts shown in FIGS. 4, 5, 7A and 7B.

Figure 4:
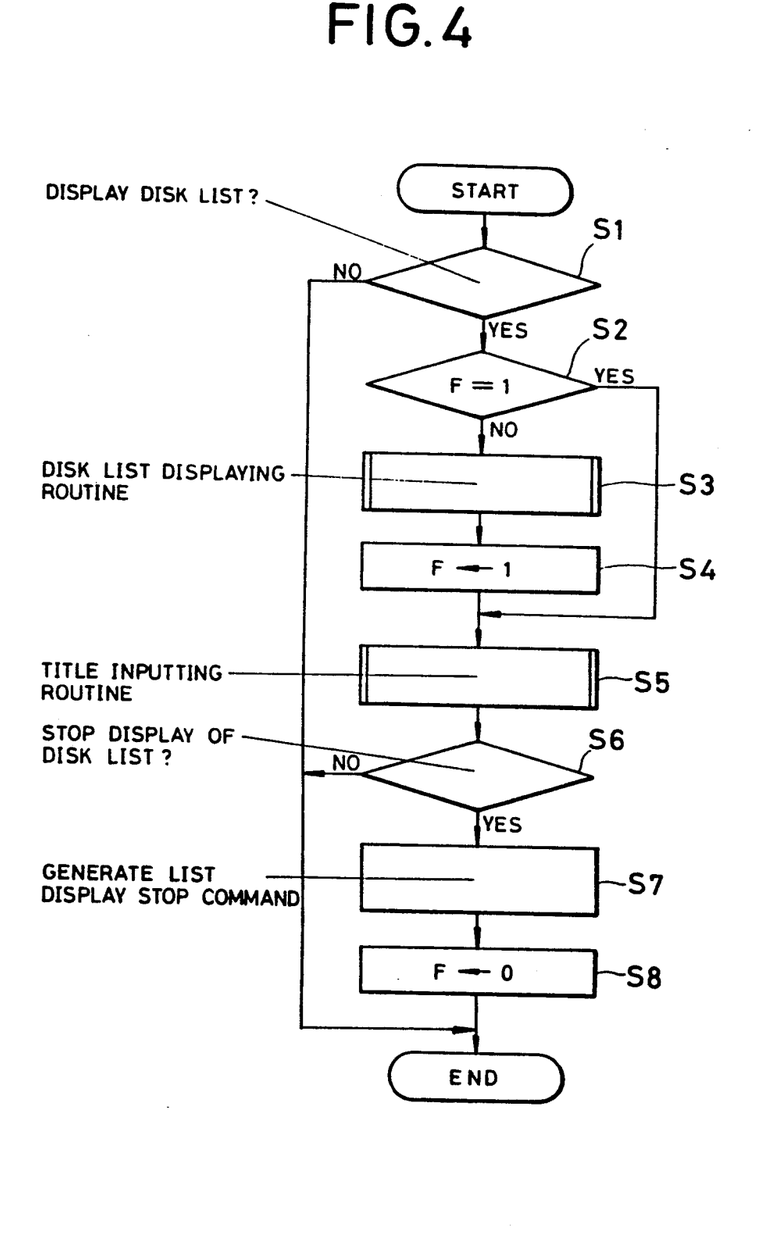
FIGS. 4, 5, 7A and 7B are flowcharts showing the operation of a microcomputer.

Referring to FIG. 4, the microcomputer 11 first determines whether or not the list of the disks is to be displayed (step S1). If it is determined that the list of the disks is to be displayed, from the fact that key operation of the play key, for example, has been carried out, the micrompmuter 11 determines whether or not a flag F is equal to 1 which indicates that the list of the disks is being displayed (step S2). If F=1, the program proceeds to step S5. If F=0, a disk list displaying routine to be hereinafter described is executed (step S3), and the flag F is set to 1 to store that the list of the disks is being displayed (step S4). Then, a title inputting routine to be hereinafter described is executed (step S5), and thereafter the microcomputer 11 determines whether or not the display of the list of the disks is to be stopped (step S6). If it is determined that the display of the list of the disks is to be stopped, from the fact that key operation of the stop key, for example, has been carried out, the microcomputer 11 generates a list display stop command to the driving circuit 12 (step S7), and resets the flag F to 0 to store that the list of the disks is not being displayed (step S8).

Figure 3:
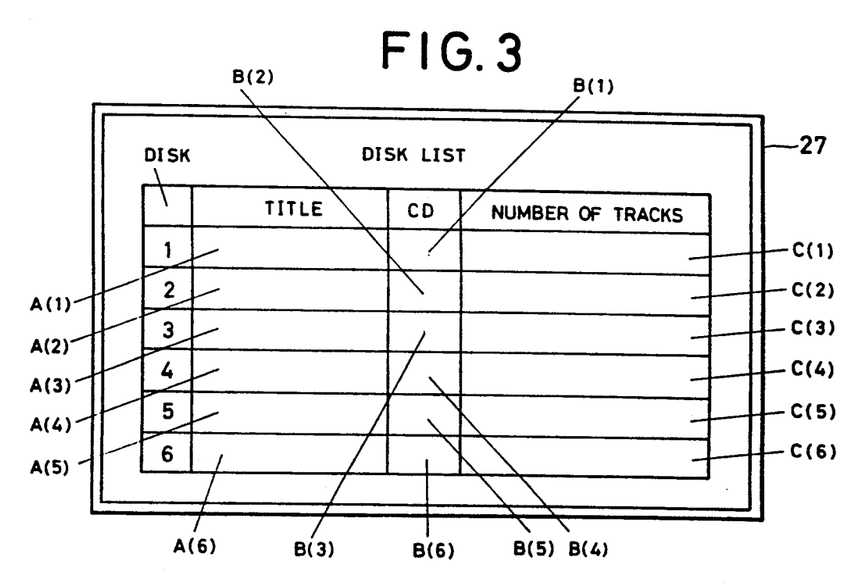
FIG. 3 is an illustration of a display pattern of a disk list to be displayed on a display.
Figure 5:
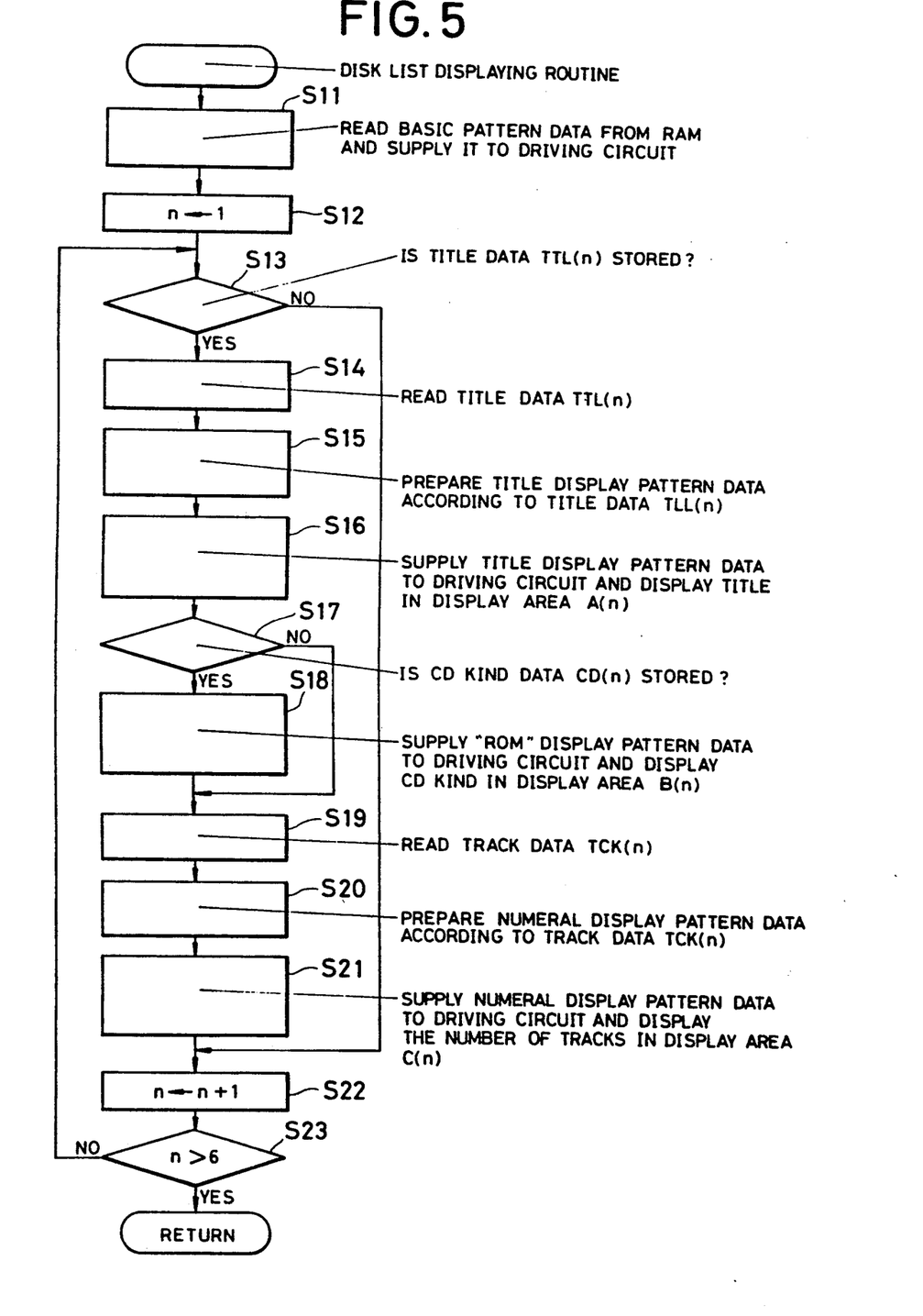

Referring next to FIG. 5 which shows the disk list displaying routine, a basic display pattern data is first read from the RAM 28, and is supplied to the driving circuit 12 (step S11). Accordingly, the display columns as shown in FIG. 3 are displayed. Then, the variable n is set to 1 (step S12), and it is determined whether or not the title data TTL(n) corresponding to the disk number n is stored in the display data memory area of the RAM 28 (step S13). If the title data TTL(n) is stored, it is read from the display data memory area (step S14), and a title display pattern data is prepared from character display pattern data preliminarily stored in the ROM 29, according to the title data TTL(n) (step S15). Then, the title display pattern data prepared above is supplied to the driving circuit 12 to display a title according to the title display pattern data in the display area A(n) of the display columns (step S16).

Next, it is determined whether or not the CD kind data CD(n) is stored in the display data memory area (step S17). If the CD kind data CD(n) is stored as CD(n) =ROM, a CD kind display pattern data indicating "ROM" is supplied to the driving circuit 12 to display "ROM" as a CD kind according to the display pattern data in the display area B(n) of the display columns (step S18). Then, the program proceeds to step S19. If the CD kind data CD(n) is not stored in step S17, the program skips step S18 to proceed to step S19. In step S19, the track data TCK(n) is read from the display data memory area, and a numeral (the number of tracks) display pattern data indicated by the track data TCK(n) is prepared (step S20). Then, the numeral display pattern data prepared above is supplied to the driving circuit 12 to display the number of tracks according to the numeral display pattern data in the display area C(n) of the display columns (step S21). Then, 1 is added to the variable n (step S22), and it is determined whether or not the variable n is greater than 6 (step S23). If n≦6, the program returns to step S13. If n>6, the present routine is ended.

Further, if the title data TTL(n) is not stored in step S13, the program proceeds to step S22.

Figure 6:
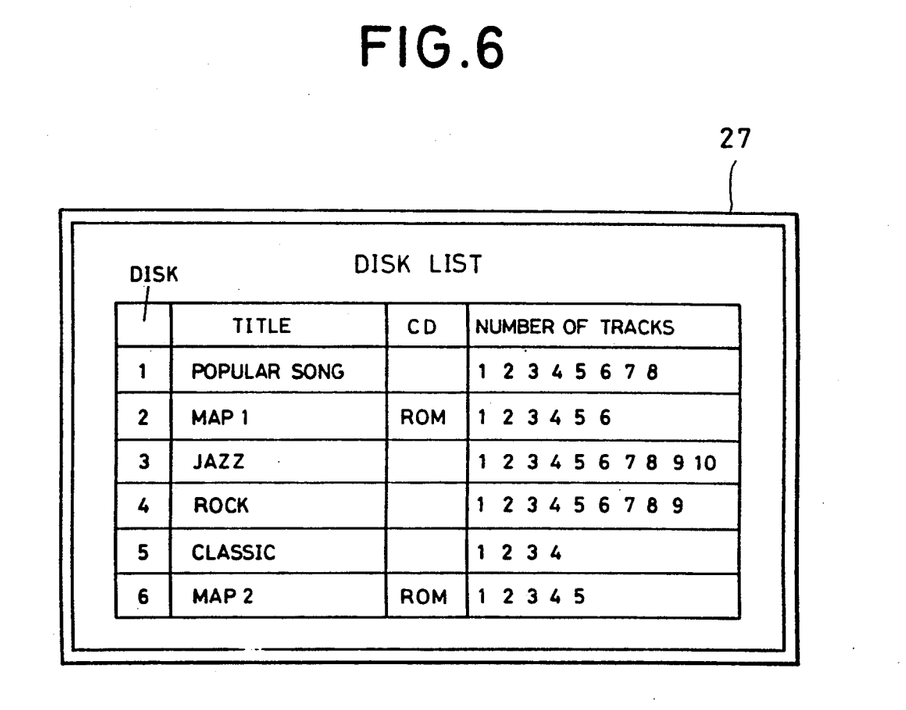
FIG. 6 is an illustration of an exemplary display result of the disk list.

The result of the execution of the above-mentioned disk list displaying routine is shown in FIG. 6, for example, wherein the title, the CD kind and the number of tracks for every disk accommodated in the magazine 1 are displayed on the display 27.

Figure 7A:
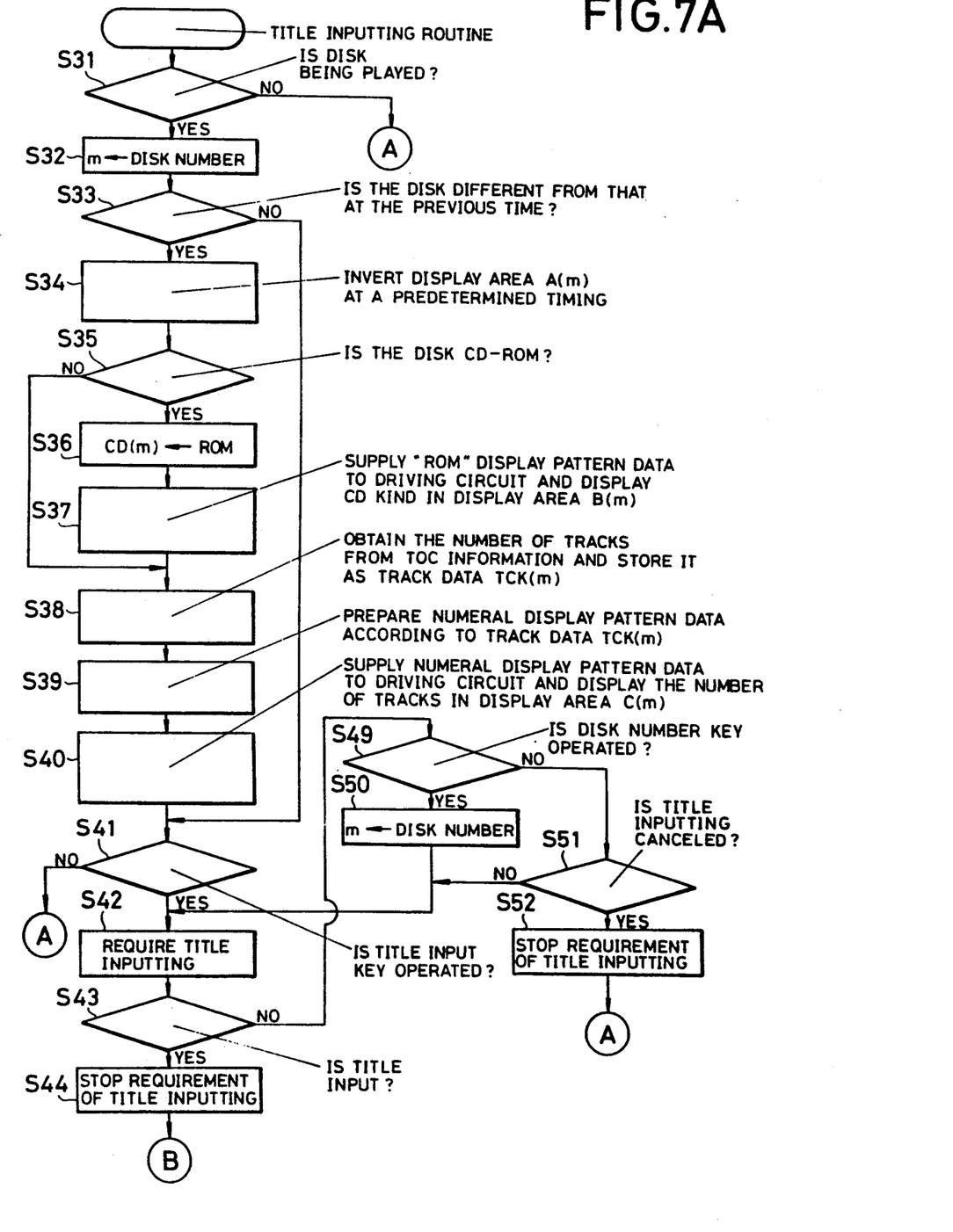
Figure 7B:
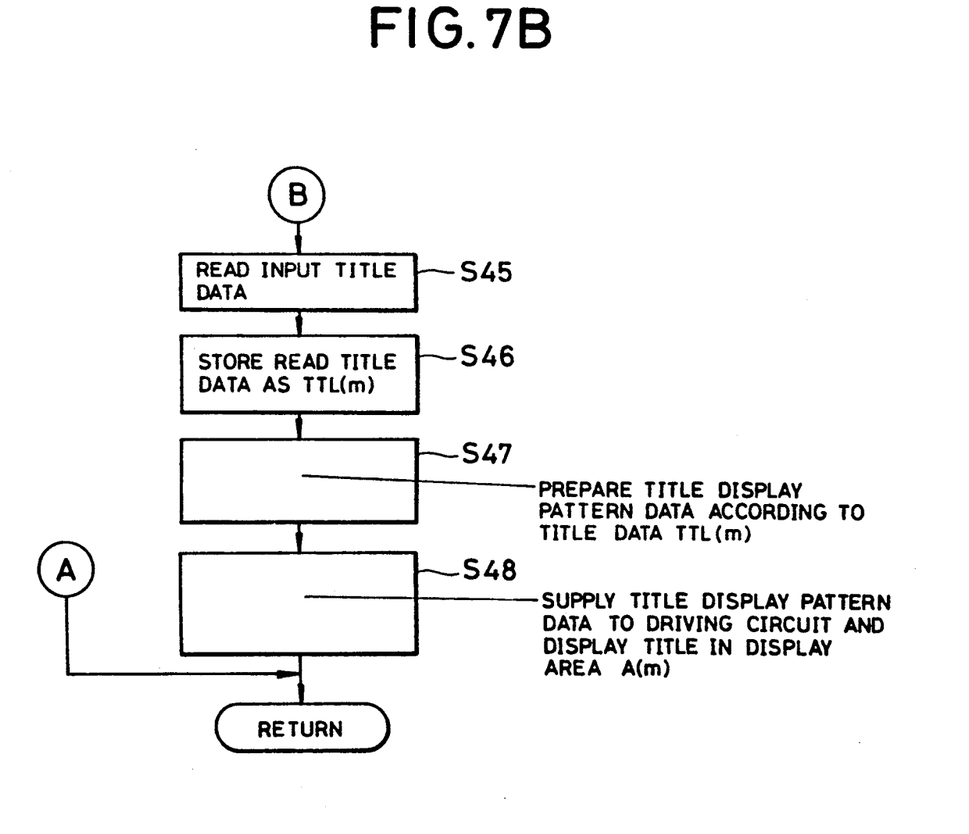

Referring next to FIGS. 7A and 7B which show the title inputting routine, it is first determined whether or not a disk is being played (step S31). If the disk is being played, the number of this disk being played is set to m (step S32). Then, it is determined whether or not the disk number m is the same as that upon previous execution of this step (step S33). If the disk number m is different from the previous one, the microcomputer 11 generates a command to the driving circuit 12 so as to invert the display area A(m) at a predetermined timing (step S34). Accordingly, the title display indicating the disk being played on the display 27 is blinked. Then, it is determined from the TOC information whether or not the disk being played is CD-ROM (step S35). If this disk is ROM, the CD kind data CD(m) is set to "ROM" in the display data memory area of the RAM 28 (step S36). Then, the display pattern data 10 indicating "ROM" is supplied to the driving circuit 12 to display the CD kind of "ROM" in the display area B(m) (step S37). Then, the program proceeds to step S38. In step S35, if the disk is not CD-ROM, it is determined that the disk is an ordinary audio CD, and the program therefore proceeds directly to step S38. In step S38, the number of tracks in the disk being played is obtained from the TOC information, and it is stored as the track data TCK(m) into the display data memory area of the RAM 28. Then, a numeral (the number of tracks) display pattern data is prepared in accordance with the track data TCK(m) (step S39). The numeral display pattern data is supplied to the driving circuit 12 to display the number of tracks in the display area C(m) (step S40). Accordingly, when the disk being played is exchanged to just thereafter play a different disk, the CD kind and the number of tracks being displayed is updated.

After the execution of step S40, it is determined whether or not the title input key has been operated (step S41). If the title input key has been operated, title inputting is required of an operator by displaying a message such as "INPUT A TITLE BY KEY OPERATION" on the display 27 (step S42), and it is then determined whether or not the title inputting by key operation has been ended (step S43). If the title inputting has been ended by the operation of the predetermined keys, the requirement of the title inputting is stopped (step S44), and a title data created by the key operation is read (step S45). Then, the title data read is stored as TTL(m) into the display data memory area of the RAM 28 (step S46). Further, a title display pattern data is prepared from the character display pattern data preliminarily stored in the ROM 29, according to the title data TTL(m) (step S47), and the title display pattern data is supplied to the driving circuit 12 to display the title in the display area A(m) (step S48). Alternatively, every time one character of the title is input, it may be displayed in the display area A(m).

In step S43, if no title is input, it is determined whether or not one of the disk number keys has been operated (step S49). If one of the disk number keys has been operated, the disk number corresponding to the disk number key operated above is set to m (step S50), and the program returns to step S42. Accordingly, when a disk number key different from the disk number key corresponding to the disk number of the disk being played is operated, title inputting of the disk corresponding to the newly designated disk number is now awaited. In step S49, if none of the disk number keys is operated, it is determined whether or not the title inputting is to be canceled (step S51). If it is determined that the title inputting is to be canceled, from the fact that the title input key has been operated again, the requirement of the title inputting is stopped (step S52), and the present routine is ended. In step S51, if it is determined that the title inputting is not to be canceled, the program returns to step S42.

In the above preferred embodiment, the data of the title and the disk kind for each disk in the single magazine are stored. However, the data of the title and the disk kind for each disk in a plurality of magazines may be stored. In this case, it is determined from the TOC information which of the magazine is set, and the title and the disk kind of each disk in the magazine determined above are displayed on the display.

As described above, the display apparatus for the multidisk player according to the present invention is designed to store data of titles and disk kinds for a plurality of disks and read all the stored data to display the title and the disk kind of each disk on a display in accordance with the read data.

Accordingly, a user can acknowledge the content of each disk at a glance without actually playing the disks. Furthermore, the user can conveniently distinguish an audio disk from a ROM disk and select a desired one of these disks.

What is claimed is:

1. A display apparatus for a multidisk player capable of accommodating a plurality of disks including an audio disk and a read only memory disk, and for selectively playing one of said disks, said display apparatus adapted to display titles and kinds of disks in said multidisks player for user viewing, the display apparatus comprising:

memory means for storing information including titles and disk kinds for said plurality of disks, certain of said information derived from said disks; and control means for reading said information stored in said memory means and displaying the title and the disk kind of all said plurality of disks on a display in accordance with the read information.

2. The display apparatus for the multidisks player as defined in claim 1, wherein when a title of a said disk may be designated by an input key operation, said memory means storing said title of said designated disk.

3. The display apparatus for the multidisk player as defined in claim 1, wherein said memory means determines whether or not a selected disk is a ROM disk in accordance with table of contents information extracted from a signal read from said selected disk, and stores a result of said determination of disk kind.

* * * * *